Feb. 2, 1960     L. C. LUDBROOK     2,923,875

LOW FREQUENCY ELECTRICAL GENERATORS

Filed March 25, 1958

INVENTOR
LESLIE CARTER LUDBROOK

ATTORNEY

United States Patent Office 2,923,875
Patented Feb. 2, 1960

2,923,875

LOW FREQUENCY ELECTRICAL GENERATORS

Leslie Carter Ludbrook, Cawston, near Rugby, England, assignor to The British Thomson-Houston Company Limited, London, England, a British company Application March 25, 1958, Serial No. 723,818

Claims priority, application Great Britain March 25, 1957

2 Claims. (Cl. 321—4)

This invention relates to electrical equipment for generating electrical voltages or currents of low frequency, i.e. less than the normal mains supply frequency of 50 cycles per second and is applicable to the generation of voltages or currents of constant frequency or variable frequency.

The invention has an important application in generating polyphase A.C. currents of very low frequency, i.e. of the order of one cycle per second.

In a number of applications it is desirable to generate a very low frequency current, for example, in apparatus for stirring molten metal magnetically and in step-by-step drives for positional control apparatus.

According to the present invention a low frequency A.C. voltage generator comprises an induction regulator which includes a rotor adapted to be supplied with a single phase A.C. voltage and a stator with a plurality of phase windings, means for rectifying the voltages induced in each of said rotor windings and reversing switches connected in the output circuits of each of said rectifying means and controlled by the rotation of said rotor so that the D.C. output voltage from each reversing switch has a magnitude and polarity in accordance with the relative angular positions of the rotor and the associated stator winding.

The stator windings are phase displaced and the switches would also operate with a phase displacement so that they change over the connections at the times when the current in the phase in question passes through zero.

The rotor may be a double-pole or multi-pole and it will be appreciated that where a half rotation is referred to this refers to a half electrical rotation, i.e. 180° in the case of a double-pole rotor.

In order that the invention may be more clearly understood reference will now be made to the accompanying drawing in which.

Figure 1:
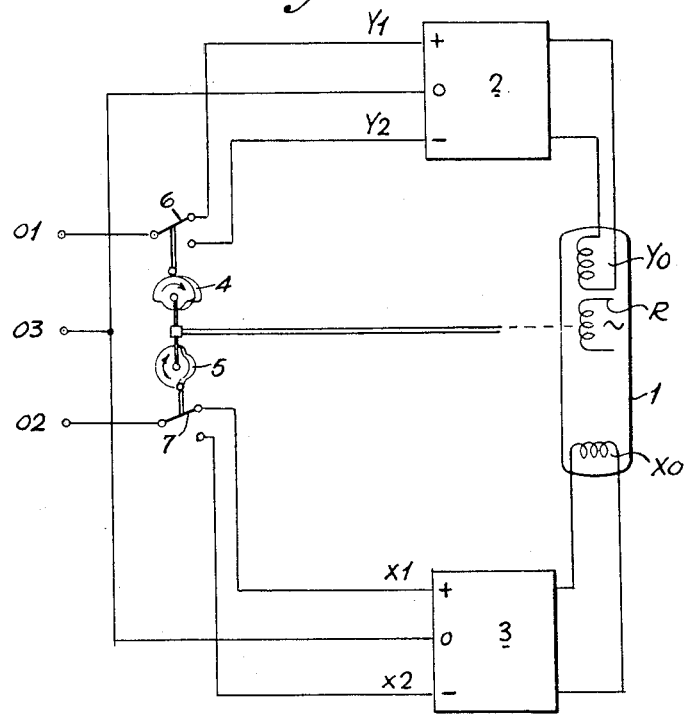
Fig. 1 shows diagrammatically an embodiment of the invention which has a transmitter with a double-pole rotor and a two phase stator.

In the drawing the transmitter is indicated by the reference 1 and is provided with a rotor R and stator windings XO and YO which are in quadrature. The winding YO feeds a rectifying apparatus 2 and the winding XO feeds rectifying apparatus 3. Cams 4 and 5 control switches 6 and 7 respectively in the outputs from the rectifying units 2 and 3. The outputs from 6 and 7 are fed to the two terminals O1 and O2. The common lead from each rectifier is led to terminal O3. It will be appreciated that the amplitude of the unidirectional output from the rectifiers 2 and 3 will depend upon the angular positioning of the rotor R of the transmitter and the transmitter stator windings are so arranged that these amplitudes will vary with a quadrature displacement. The switches 6 and 7 serve to reverse the polarity of the voltage passed to the terminals when the rotor R has been rotated through more than 180° and the switches will be so adjusted that this reversal takes place when there is substantially zero output from the corresponding rectifier.

Figure 2:
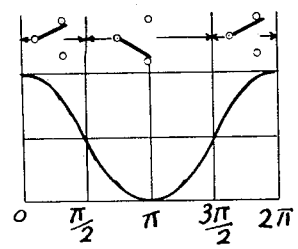
Figs. 2 and 3 are graphs showing the voltage waveform at the output terminals.
Figure 3:
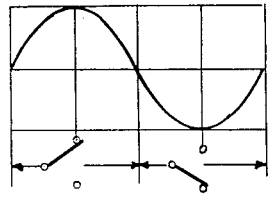

Fig. 2 is a graph showing the voltage appearing at the output terminal O1 and Fig. 3 is a similar graph showing the voltage appearing at the output terminal O2. It will be appreciated that stator phase outputs may be obtained from between the terminals O1 and the common terminal O3 and between terminal O2 and again the common terminal O3. Alternatively, of course, the connections could be made directly between O1 and O2.

What I claim is:

1. A low frequency A.C. voltage generator comprising an induction regulator having a rotor adapted to be supplied with a single phase A.C. voltage and a stator with a plurality of phase windings, means for rectifying the voltages induced in each of said stator windings so as to produce positive and negative voltages of magnitudes corresponding to the relative angular positions of the rotor and the associated stator winding, a plurality of reversing switches, each of which switches is connected respectively in the output circuit of one of said rectifying means and control gear actuated by the rotation of said rotor and adapted to operate said reversing switches so as to reverse the polarity of the output voltages from each of said switches when the voltages produced in the associated rectifier means are zero so that the output voltage from each of the said reversing switches has a magnitude and polarity in accordance with the relative angular positions of the rotor and the associated stator winding.

2. A low frequency A.C. voltage generator comprising an induction regulator having a rotor adapted to be supplied with a single phase A.C. voltage and a stator with a plurality of phase windings, means for rectifying the voltages induced in each of said stator windings so as to produce positive and negative voltages of magnitudes corresponding to the relative angular positions of the rotor and the associated stator winding, a plurality of reversing switches, each of which switches is connected respectively in the output circuit of one of said rectifying means, and a plurality of cams driven by the shaft of said rotor, each of which cams is adapted to operate one of said reversing switches so as to reverse the polarity of the output voltage from said switch when the voltages produced by the associated rectifier means are zero so that the output voltage from each of the said reversing switches has a magnitude and polarity in accordance with the relative angular positions of the rotor and the associated stator winding.

References Cited in the file of this patent
UNITED STATES PATENTS 2,415,708   Sciaky _____ Feb. 11, 1947